(12) United States Patent
Fujita et al.

(10) Patent No.: US 6,214,269 B1
(45) Date of Patent: Apr. 10, 2001

(54) BAND-SHAPED ARTICLE AND PRODUCTION PROCESS THEREFORE

(75) Inventors: Kuniaki Fujita, Fukui; Takashi Yamana, Tsukuba; Shozaburo Nagano, 19-9, Josuishinmachi 3-chome, Kodaira-shi, Tokyo, all of (JP)

(73) Assignees: Sekisui Jushi Corporation, Osaka; Shozaburo Nagano, Tokyo, both of (JP)

( * ) Notice: Subject to any disclaimer, the term of this patent is extended or adjusted under 35 U.S.C. 154(b) by 0 days.

(21) Appl. No.: 09/122,892

(22) Filed: Jul. 28, 1998

(30) Foreign Application Priority Data

Jul. 28, 1997 (JP) .................................................. 9-201328

(51) Int. Cl.[7] .............................. B32B 3/10; B32B 27/08; B32B 27/18; B32B 27/32

(52) U.S. Cl. .................................... 264/176.1; 264/177.1; 264/288.4

(58) Field of Search .............................. 264/176.1, 177.1, 264/288.4

(56) References Cited

FOREIGN PATENT DOCUMENTS

| 55-100138 | 7/1980 | (JP) . |
| 57-143524 | 9/1982 | (JP) . |
| 62-34624 | 7/1987 | (JP) . |
| 2311554 | 12/1990 | (JP) . |
| 6298991 | 10/1994 | (JP) . |
| 8508776 | 9/1996 | (JP) . |
| WO/94/24188 | 10/1994 | (WO) . |

*Primary Examiner*—Richard Weisberger

(57) ABSTRACT

A process for producing a band-shaped article comprising (1) the step (reaction step) of obtaining molten polyethylene terephthalate (B) having a high degree of polymerization by heating and melting (a) 100 parts by weight of polyethylene terephthalate (A), (b) 0.1 to 10 parts by weight of a bifunctional epoxy compound and (c) an epoxy ring-opening catalyst, (2) the step (extrusion step) of extruding the obtained molten product into a sheet from a die, and (3) the step (stretching step) of stretching the obtained sheet to 5 to 15 times in a longitudinal direction and subjecting it to heat-setting; and a band-shaped article made from polyethylene terephthalate having an index X, represented by the formula $X=Y+Z/10$ (wherein Y is an intrinsic viscosity (dl/g) measured at 35° C. in an orthochlorophenol solvent, and Z is a melt flow rate (M.F.R., g/10 minutes) measured at 280° C. under a load of 2.16 kg), of 2.75 to 3.75.

12 Claims, 3 Drawing Sheets

BAND-SHAPED ARTICLE AND PRODUCTION PROCESS THEREFORE

The present invention relates to a band-shaped article and to a production process therefor. More specifically, it relates to a band-shaped article made from a polyester and used for packing or binding and to a production process therefor. The present invention also relates to a series of technologies for utilizing recovered polyester molded articles for the production of a band-shaped article having excellent characteristic properties.

PRIOR ART

Aromatic polyesters, especially polyethylene terephthalate, have excellent characteristic properties and are widely used as fibers, films and plastics. Since mechanical properties out of the physical properties of such a polyester are greatly dependent on the polymerization degree of the polyester, a polyester having, within limits that moldability related to melt viscosity and the like permits, a high degree of polymerization is desired. Therefore, various processes for producing a polyester having a high degree of polymerization are now being studied and proposed.

A solid-phase polymerization process is known as a means of further increasing the polymerization degree of a polyester obtained by melt polymerization. The solid-phase polymerization process is a method for increasing the degree of polymerization by heating a polyester at a temperature below its melting point. However, this process gives priority to the suppression of a secondary reaction caused by thermal decomposition over the reaction rate and has such a defect that an extremely long-time reaction is required and productivity is low.

A process is known in which a polymerization promoting agent such as diphenyl carbonate or diphenyl terephthalate is added during the melt polymerization of a polyester. Although a polyester having a high degree of polymerization can be obtained by the addition of the polymerization promoting agents in a short period of time, this process has such a defect that it cannot be used without reducing the pressure of a reaction system because a phenol formed as a by-product must be distilled out of the reaction system.

Since a polyester is readily thermally decomposed and hydrolyzed at a high temperature, dry heat resistance and wet heat resistance are required for the polyester. As the dry heat resistance and wet heat resistance of a polyester is greatly dependent upon the amount of terminal carboxyl groups of the polyester, a polyester having a small amount of terminal carboxyl groups is desired.

Although a polyester having a small amount of terminal carboxyl groups can be obtained by the above solid-phase polymerization process, the process has, as described above, a defect that it has a low productivity.

As a means of reducing the amount of terminal carboxyl groups of a polyester, there has been proposed a method for reacting a compound having a glycidyl group, such as phenyl glycidyl ether, N-glycidyl phthalimide or glycidyl carboxylate, with a molten polyester. However, a satisfactory effect still cannot be obtained without a catalyst. Therefore, use of a catalyst is proposed (for example, in JP-A 57-143524 (the term "JP-A" as used herein mean an "unexamined published Japanese patent application") and the like). However, while it is possible to greatly reduce the amount of terminal carboxyl groups, it is impossible to produce a polyester resin having a high degree of polymerization required as a saturated polyester resin.

In recent years, the necessity for the recovery and reuse of plastics has been globally recognized in view of resource saving and environmental preservation, and the recovery and reuse of used polyester films and bottles are vigorously in progress.

The Container and Package Recycling Law has recently been enforced in Japan and obliges users to recover and recycle PET bottles. The development of a technology for recycling recovered PET bottles is under way.

However, since recovered polyester molded articles have repeatedly experienced heat hysteresis that they have been molten by heating at the time of molding, the polymerization degree thereof is low and the amount of terminal carboxyl groups thereof is increased. Hence, when they are directly re-molten and molded, a molded product having good physical properties cannot be obtained. Therefore, a process capable of increasing the polymerization degree and at the same time reducing the amount of terminal carboxyl groups of a recovered polyester having deteriorated physical properties in a short period of time is desired.

Technologies for improving the physical properties and moldability of a polyester, mainly a polyester molded article, have been proposed for the purpose of recycling it. Some of them will be described below.

JP-A 2-311554 (the term "JP-A" as used herein means an "unexamined published Japanese patent application") discloses a composition having the increased crystallization rate of a polyester and improved productivity, prepared by melt-kneading a polyester resin with a higher paraffin having 40 to 100 carbon atoms on the average. This technology is worthy of notice also for the recovery and recycling of polyester molded articles. However, it cannot be said that a molded product from the obtained composition has particularly improved physical properties as compared with the raw material resin.

JP-A 6-298991 discloses a method for recovering a resin having improved impact properties by melt-kneading an epoxy group-containing ethylene copolymer into a molded and processed product made of a thermoplastic resin such as a polyester resin or a polycarbonate resin. This method is intended for restoring the deteriorated impact properties of the recovered resin to increase the recycling value of the resin. Since this method is aimed primarily at restoration of impact properties, other properties such as heat resistance and physical strength are not improved by the method.

JP-A 8-508776 proposes a process for heat-melting a bifunctional epoxy resin and a steric hindering hydroxyphenyl alkyl phosphonate or half-ester by heating so as to recover and recycle polyester molded articles. Using this method, a polyester having a higher intrinsic viscosity and higher physical properties than a recovered polyester is regenerated in a relatively short period of time. However, it cannot be said that this process is satisfactory as a technology for recycling recovered molded articles which requires a low cost because the steric hindering phenol used is very expensive.

Under the circumstances, the inventors of the present invention have conducted studies on a process for obtaining a band-shaped article having improved physical properties from a polyester, especially recovered polyester molded articles, advantageously from an industrial point of view.

Heretofore, many proposals for a polyester band-shaped article and a production process therefor have been made. For example, JP-A 55-100138 discloses a rolled band obtained by stretching in a longitudinal direction and an axial direction at predetermined ratios to have a plane orientation degree of 2.5 or more, and JP-B 62-34624 (the term "JP-B" as used herein means an "examined Japanese patent publication") discloses a stretched band made from a polyester having a relatively high degree of polymerization and an intrinsic viscosity of 0.9 to 1.2. In general, these are bands made from a polyester obtained by polymerization or a polyester having a specified high degree of polymerization as a raw material, and these technologies are not suitable for the production of a band from recovered polyester molded articles having a low degree of polymerization and low physical properties.

It is therefore the first object of the present invention to provide a band-shaped article having improved physical properties, particularly a band for binding, using an ordinary polyester, particularly recovered polyester molded articles; as well as a production process therefor.

It is the second object of the present invention to provide a band-shaped article which is stretched in a longitudinal direction, has excellent physical strength and does not cause splitting.

It is the third object of the present invention to provide a band-shaped article which is easily thermally welded by surface heat pressing and allows bands to be bonded together firmly, and consequently, has excellent workability without necessity of a fastening metal part for fixing bands; as well as a production process therefor.

It is another object of the present invention to provide an industrial process for producing the above band-shaped article having improved characteristic properties, which uses a recovered polyester molded article, can increase the reduced polymerization degree of the recovered polyester molded article with ease, and can successively mold the recovered polyester molded article into a band form and stretch it.

To attain the above objects of the present invention, the present inventors have conducted studies on a process which can increase the polymerization degree of a polyester and improve the physical properties of the polyester with a simple means and after the reaction, mold the obtained sheet into a band-shaped article immediately. As a result, they have found that the following advantages can be obtained by a simple means such as melting and kneading when a polyester having such a degree of polymerization that physical properties are not sufficient for molding into a band-shaped article is used and a bifunctional epoxy compound and a specific catalyst are caused to act on the polyester.

(a) A polyester having a high degree of polymerization can be obtained by a simple means in a short period of time.
(b) The obtained polyester has a small amount of terminal carboxyl groups.
(c) Although it is assumed that a branching reaction or cross-linking reaction occurs partially, there can be obtained a band-shaped article which does not cause splitting even when the polyester is stretched in a longitudinal direction at a high ratio.
(d) The obtained band-shaped article can be easily thermally welded by surface heat pressing and can be bonded firmly.
(e) A band-shaped article with high value added can be obtained from recovered polyester molded articles at a low cost.

The present invention has been attained based on the above findings and is to provide a process for producing a band-shaped article comprising (1) the step (reaction step) of obtaining molten polyethylene terephthalate (B) having a high degree of polymerization by heating and melting (a) 100 parts by weight of polyethylene terephthalate (A), (b) 0.1 to 10 parts by weight of a bifunctional epoxy compound and (c) an epoxy ring-opening catalyst, (2) the step (extrusion step) of extruding the obtained molten product into a sheet from a die and (3) the step (stretching step) of stretching the obtained sheet to 5 to 15 times in a longitudinal direction and subjecting it to heat setting.

According to the present invention, there is further provided a band-shaped article made from polyethylene terephthalate having an index X, represented by the following formula, of 2.75 to 3.75.

$$X = y + Z/10$$

wherein Y is an intrinsic viscosity (dl/g) measured at 35° C. in an orthochlorophenol solvent, and Z is a melt flow rate (M.F.R., g/10 minutes) measured at 280° C. under a load of 2.16 kg.

The present invention will be described in detail hereinafter. A description is first given of a process for producing a band-shaped article.

In the process for producing a band-shaped article of the present invention, polyethylene terephthalate (A) as a raw material is a polyester comprising terephthalic acid as a main dicarboxylic acid component and ethylene glycol as a main glycol component. It is desired that the polyethylene terephthalate (A) comprise ethylene terephthalate units in an amount of 70 mol % or more, preferably 80 mol % or more, of the total of all recurring units.

In the copolyester, examples of a dicarboxylic acid component other than terephthalic acid include an aromatic dicarboxylic acid such as isophthalic acid, naphthalenedicarboxylic acid, diphenyldicarboxylic acid, diphenylsulfonedicarboxylic acid, diphenoxyethanedicarboxylic acid, diphenylether dicarboxylic acid, methylterephthalic acid, methylisophthalic acid or the like; and aliphatic dicarboxylic acid such as succinic acid, adipic acid, sebacic acid, decanedicarboxylic acid, dodecanedicarboxylic acid or the like.

Examples of a glycol component other than ethylene glycol include trimethylene glycol, tetramethylene glycol, hexamethylene glycol, decamethylene glycol, neopentyl glycol, cyclohexane dimethanol, polyoxyethylene glycol, polyoxypropylene glycol, polyoxytetramethylene glycol or the like. Of these, cyclohexane dimethanol and tetramethylene glycol are preferred.

A hydroxycarboxylic acid as a copolymer component is, for example, ω-hydroxycaproic acid, hydroxybenzoic acid, hydroxyethoxybenzoic acid or the like.

The polyethylene terephthalate (A) to which the process of the present invention can be applied can contain, as a copolymer component, a compound having 3 or more functional groups, such as trimellitic acid, pyromellitic acid, trimethylolpropane or pentaerythritol within limits that it keeps substantially straight-chain.

The polyethylene terephthalate (A) to which the process of the present invention can be applied preferably has an intrinsic viscosity, measured at 35° C. in an orthochlorophenol solvent, of 0.3 dl/g or more, more preferably 0.4 dl/g or more. When the intrinsic viscosity is lower than 0.3 dl/g, the degree of polymerization may not be sufficiently increased even by the process of the present invention. The upper limit of the intrinsic viscosity of the polyethylene terephthalate (A) is generally determined from a value obtained by a normal polymerization reaction and the intrinsic viscosity of a molded article when a recovered polyester molded article is used. It is generally 0.8 dl/g, preferably 0.7 dl/g.

The bifunctional epoxy compound that can be used in the process of the present invention is not particularly limited, and any bifunctional epoxy compounds available on the market are acceptable as long as they have two epoxy groups in the molecule. Either an epoxy compound having a high molecular weight or one having a low molecular weight may be used. These epoxy compounds may be used alone or in combination of two or more. Bifunctional epoxy compounds available on the market include bisphenol A epoxy resins, bisphenol F epoxy resins, bisphenol AD epoxy resins, bisphenol S epoxy resins, cyclic aliphatic epoxy resins, glycidyl ester-based epoxy resins, glycidyl amine-based epoxy resins and the like. Diglycidyl ethers of polyalkylene glycol and diglycidyl ethers of alkylene glycol may also be used as the bifunctional epoxy compound. More specifically, diglycidyl ethers of polyethylene glycol (such as Epolite 200E and 400E of Kyoeisha K.K.), diglycidyl ethers of polypropylene glycol (such as Epolite 200P of Kyoeisha K.K.), diglycidyl ethers of neopentyl glycol (such as Epolite 1500 NP of Kyoeisha K.K.), diglycidyl ethers of 1,6-hexanediol (Epolite 1600 of Kyoeisha K.K.) and the like can be used. Of these, bisphenol A epoxy resins, polyalkylene glycol glycidyl ether-based epoxy compounds and glycidyl ester-based epoxy compounds are preferred, and bisphenol A diglycidyl ether is particularly preferable because it can be easily obtained as an epoxy compound having relatively high purity. A trifunctional epoxy compound or a monofunctional epoxy compound may be used in a small amount as an epoxy compound.

In the process of the present invention, the optimal amount of the bifunctional epoxy compound is determined based on the amount of terminal carboxyl groups of the polyethylene terephthalate (A) participating in the reaction and the value of intrinsic viscosity of the target polyethylene terephthalate (B). In general, the bifunctional epoxy compound is used in an amount of 0.1 to 10 parts by weight, preferably 0.2 to 8 parts by weight, particularly preferably 0.3 to 5 parts by weight, based on 100 parts by weight of the polyethylene terephthalate (A). Below 0.1 part by weight, the effect of the bifunctional epoxy compound is small. The upper limit may be more than 10 parts by weight, but in this case, an unreacted epoxy compound tends to remain in the polyester with the consequence that a reaction product is liable to be affected by the unreacted epoxy compound. Therefore, it is disadvantageous.

The epoxy ring-opening catalyst used in the present invention has a function to promote a reaction between the epoxy compound and the polyester (A), thereby increasing the molecular weight of the polyester (A). As a result, therefore, the catalyst has a function to increase the molecular weight of the polyester (A). In addition to this function, the catalyst has a different influence, depending on its type, on the performance and physical properties of the obtained polyester (B) having a high degree of polymerization. Thus, the use of the catalyst in the present invention increases the degree of polymerization. The obtained polyester (B) having a high degree of polymerization retains thermoplasticity, can be therefore melt-spun or melt-molded and is soluble in a certain solvent.

The epoxy ring-opening catalyst used in the present invention has the above functions, and is at least one member selected from the group consisting of (i) carboxylates, halides, carbonates-and bicarbonates of alkali metals, (ii) carboxylates of alkaline earth metals, (iii) carboxylates of aluminum, zinc and manganese, (iv) carbonates of manganese, (v) β-keto complexes of aluminum and cobalt and (vi) aryl- and alkyl-substituted phosphines.

The above catalysts are divided into two types, i.e., carboxylates of metals and others. Metals forming metal salts of carboxylic acids include alkali metals, alkaline earth metals, aluminum, zinc and manganese. More specifically, the metals include alkali metals such as lithium, sodium and potassium; alkaline earth metals such as magnesium, calcium, strontium and barium; aluminum; zinc; and manganese. Of these, lithium, sodium, potassium, calcium, zinc and manganese are preferred. Manganese is particularly preferred.

Carboxylic acids forming salts with these metals may be either monocarboxylic acids, dicarboxylic acids or other polycarboxylic acids, and may also be polymer-like carboxylic acids such as ionomers. The number of carbon atoms of these carboxylic acids is not particularly limited. However, the number of carbon atoms of the carboxylic acids must be 1 or more, and the type of a carboxylic acid used may influence the crystallization rate of the obtained polyester (B) having a high degree of polymerization. That is, when intermediate and higher carboxylic acids, particularly metal salts of intermediate and higher fatty acids are used as a catalyst, polyesters (B) having a high degree of polymerization and improved crystallization rate can be obtained. Particularly when a metal salt of a higher fatty acid is used as a catalyst, a polyester (B) having a high degree of polymerization and further improved crystallization rate can be obtained. Examples of these intermediate and higher carboxylic acids will be described below.

The catalyst other than the above metal salts of carboxylic acids is at least one member selected from the group consisting of halides, carbonates and bicarbonates of alkali metals, carbonates of manganese, β-diketo complexes of cobalt, β-diketo complexes of aluminum and aryl- and alkyl-substituted phosphines. These catalysts have little effect of improving the crystallization rate of the polyester (B) obtained by addition. Illustrative examples of the catalyst include chlorides, bromides and iodides of alkali metal salts such as lithium, sodium and potassium; carbonates; bicarbonates; carbonates of manganese; cobalt acetyl acetonate; aluminum acetyl acetonate; tributyl phosphine; trioctyl phosphine; and triphenyl phosphine.

As for intermediate and higher carboxylic acids out of carboxylic acids forming the above catalyst of the present invention, the higher carboxylic acids may be an oxide of paraffin having an average molecular weight of 500 to 1,000.

The long-chain paraffin having an average molecular weight of 500 to 1,000 of the above oxide does not exist in nature and is generally obtained as synthetic wax when synthetic oil is produced from coal by the Fischer-Tropsch method. Only Sasol Ltd. of the Republic of South Africa carries out the Fischer-Tropsch method on a commercial scale and sells the synthetic wax under the trade name of Sasol Wax presently. Sasol Wax products include high-melting paraffin wax called straight type H1, 2, C1 or C2, oxidized paraffin wax called A1, A6 or A7, and oxidized and saponified paraffin wax called A2, A3 and A14.

When the catalyst is used in the reaction of the present invention, two or more catalysts may be used in combination or added separately. Alternatively, the catalyst may be added to the polyester (A) in advance or added to an epoxy compound and molten by heating. The optimal amount of the catalyst used differs depending on the type of the catalyst. When a catalyst having great activity is used, if the amount of the catalyst is too large, a cross-linking reaction occurs and an insoluble gel is formed. When a catalyst having small activity is used, if the amount of the catalyst is too small, the polymerization degree of the obtained product may not be increased sufficiently and the wet heat resistance may not be fully improved. The amount of the catalyst is generally 0.001 to 5 parts by weight based on 100 parts by weight of the polyethylene terephthalate (A). It is preferably 0.01 to 3 parts by weight, particularly preferably 0.01 to 0.1 part by weight, based on 100 parts by weight of the polyethylene terephthalate (A).

To carry out the process of the present invention, the polyethylene terephthalate (A) may be in the form of either a pellet or a ground product of a molded article. Particularly, when a molded article is recycled, a ground product of the molded article may be used directly or re-molten and formed into chips. It is desired to fully dry the polyethylene terephthalate (A) to reduce the moisture content thereof. The polyethylene terephthalate (A), the epoxy compound and the catalyst are mixed in a predetermined ratio and molten by heating. The heat melting method is not particularly limited. Since an increase in the degree of polymerization and a reduction in the amount of terminal carboxyl groups proceed swiftly according to the process of the present invention and the reaction can be generally completed in less than 15 minutes, preferably 0.5 to 15 minutes, particularly preferably 1 to 10 minutes, the method of mixing and heat-melting with an extruder or injection molding machine can be advantageously employed. The heating temperature is preferably in the range of from the melting point of the polyester to 330° C., more preferably from a temperature higher than the melting point of the polyester to 310° C. The reaction does not proceed if the polyester is not molten, and thermal decomposition of the polyester may occur above 330° C.

The mechanism that the polymerization degree of the polyester is increased and the amount of terminal carboxyl groups is reduced by the process of the present invention in a very short period of time is not clarified yet. It is presumed, however, that the catalyst has a function to promote a reaction between the carboxyl group of the polyester and the oxirane group of the epoxy compound so that the molecules of the polyester having a terminal carboxyl group are bonded by the epoxy compound. Consequently, due to extension of the molecular chain, the degree of polymerization is increased and at the same time the amount of the terminal carboxyl groups is reduced. When the catalyst alone is added to the polyester and these are molten by heating, an increase in the degree of polymerization and a reduction in the amount of terminal carboxyl groups are not observed, and when only the epoxy compound is added to the polyester and the mixture is molten by heating, an increase in the degree of polymerization and a reduction in the amount of terminal carboxyl groups are extremely small. Only when the epoxy compound and the catalyst are added to the polyester at the same time and the mixture is molten by eating, a marked increase in the degree of polymerization and a marked reduction in the amount of terminal carboxyl groups are observed in most cases.

In addition, the polyester having a high degree of polymerization obtained by the process of the present invention has an extremely small content of a gel and is easily melt molded, and the physical properties of a molded product thereof are excellent.

According to the present invention, a polyethylene terephthalate (B) having a high degree of polymerization and an intrinsic viscosity higher than the intrinsic viscosity of the polyethylene terephthalate (A) by at least 0.05 dl/g is obtained by the above heat melting. Under preferred conditions, a polyethylene terephthalate (B) having a high degree of polymerization and an intrinsic viscosity at least 0.08 dl/g higher than that of the polyethylene terephthalate (A) is obtained.

Since the process of the present invention can increase the polymerization degree of the polyester (A) and reduce the amount of terminal carboxyl groups in a very short period of time with extreme ease, it can be advantageously applied to the recycling of a recovered polyester molded article having a reduced degree of polymerization. Since the polyester molded article has a reduced degree of polymerization and an increased amount of terminal carboxyl groups due to heat hysteresis at the time of molding, if it is again molten by heating as it is and molded, the polymerization degree thereof further decreases and the amount of terminal carboxyl groups further increases, thereby inevitably causing a further reduction in mechanical strength and wet heat resistance. Since heat melting in the process of the present invention can be carried out during a relatively short residence time in the cylinder of an extruder or injection molding machine, a recovered polyester molded article is ground and the ground polyester product is mixed with an epoxy compound and a catalyst at the time when it is re-molded by extrusion or injection molding, whereby restoration of the reduced degree of polymerization and reduction of the amount of terminal carboxyl groups are achieved simultaneously with molding for recycling without adding a special step. Thus, there can be obtained a molded product such as a band-shaped article having excellent physical properties such as mechanical strength, wet heat resistance and improved antistatic properties.

The heat melting reaction of the present invention is desirably carried out under agitation and kneading in a cylindrical reactor such as an extruder or injection molding machine. Stated more specifically, either a single-screw or twin-screw extruder or injection molding machine may be used. A twin-screw extruder or injection molding machine is preferred.

The polyethylene terephthalate (A) as a raw material, a bifunctional epoxy compound and a catalyst are supplied from one end of the cylindrical reactor at the same time or in a desired order (or from separate port(s)) and molten by heating, and the polymer is moved continuously so that it resides in the cylinder for a predetermined reaction time. The heat melting time is 0.5 to 15 minutes, preferably 1 to 10 minutes, and the temperature is in a range of from the melting point of the polymer to 330° C., preferably from the melting point of the polymer to 310° C.

It is desired to install a gear pump at the other end of the cylinder to determine the discharge amount of the polymer. A static mixer or filter may be provided in front of the die.

The polymer is extruded from a slit that corresponds to the cross section of a band-shaped article, of the die at the other end of the reactor. The polymer extruded into a sheet is let pass through a cooling tank to be cooled to about 80 to 130° C. and then stretched. Stretching may be carried out in one step or two steps. At least a pair of rollers are used and the speed of the two rollers is adjusted to control stretching ratio. The total stretching ratio is 5 to 15 times, preferably 6 to 12 times. The thickness of the sheet can be made constant and partial stretching in a transverse direction is made possible by adjusting the gap between the pair of rollers.

The band-shaped article which has been stretched as described above is heat set. The heat setting is suitably carried out at 160 to 250° C., preferably 180 to 230° C. for 1 to 10 seconds. The surface of the heat set band-shaped article is embossed as required and taken up as a product in the end.

The thus obtained band-shaped article has excellent physical properties as a material for packing or binding. That is, according to the present invention, a band-shaped article having an intrinsic viscosity 0.05 dl/g or more, preferably 0.08 dl/g or more, particularly preferably 0.1 dl/g or more, higher than that of a polyester recovered from a polyester molded article and a terminal carboxyl group content of 30 equivalents/$10^6$ g or less, preferably 25 equivalents/$10^6$ g or less can be obtained from the above polyester having a reduced degree of polymerization and a relatively large amount of terminal carboxyl groups by a simple means.

The band-shaped article obtained by the above process of the present invention has improved physical properties because the polymerization degree thereof is further increased by a reaction between the polyethylene terephthalate (A) as a raw material and the bifunctional epoxy compound. However, in addition to the above advantage obtained by an increase in the degree of polymerization, it was found that the band-shaped article obtained by the process of the present invention has such an advantage that the splitting resistance thereof is greatly improved and band-shaped articles can be firmly bonded together by thermal welding.

According to studies conducted by the present inventors, a partial branching reaction or cross-linking reaction takes place along with a reaction between the bifunctional epoxy compound and the polyethylene terephthalate (A) in the presence of a catalyst for increasing the degree of polymerization. This branching or cross-linking reaction is not in a degree of interfering with melt flowability (moldability) and it is rather found that the reaction contributes to the above favorable properties of the obtained band-shaped article. The degree of this partial branching or cross-linking reaction can be obtained indirectly by measuring melt flowability (M.F.R. value).

That is, when the polyethylene terephthalate (B) forming the band-shaped article of the present invention is measured for its intrinsic viscosity (I.V.–I) and M.F.R. value (M.F.R.–I) and the measured M.F.R. value is compared with the M.F.R. value (M.F.R.–0) of a polyethylene terephthalate (polyethylene terephthalate which is not reacted with the bifunctional epoxy compound) as a raw material having almost the same intrinsic viscosity as that of the polyethylene terephthalate (B), the M.F.R. value (M.F.R–I) is apparently different from, and larger than, the M.F.R. value (M.F.R.–0) of the polyethylene terephthalate as a raw material (melt flowability is high). When the swell value which will be described hereinafter of the polyethylene terephthalate (B) is compared with that of the polyethylene terephthalate as a raw material, the polyethylene terephthalate (B) which has been reacted with the bifunctional epoxy compound shows a value distinctly different from that of the polyethylene terephthalate which is not reacted with the bifunctional epoxy compound.

Therefore, according to the present invention, there is provided a band-shaped article made from polyethylene terephthalate having an index X, represented by the following formula, of 2.75 to 3.75.

$$x=Y+Z/10$$

wherein Y is an intrinsic viscosity (dl/g) measured at 35° C. in an orthochlorophenol solvent, and Z is a melt flow rate (M.F.R., g/10 minutes) measured at 280° C. under a load of 2.16 kg.

The polyethylene terephthalate (A) obtained by a normal polymerization reaction generally has an intrinsic viscosity of about 0.6 to about 1.2, a value represented by the above index X of about 1.8 to about 2.3, and a swell value of about −10% to about −35%, though these values vary depending on application.

In contrast, the band-shaped article of the present invention has an index X of 2.75 to 3.75 and, accordingly, can be distinctly distinguished from a band-shaped article made from ordinary polyethylene terephthalate. The index X of the band-shaped article of the present invention is preferably 2.75 to 3.65, the most preferably 2.8 to 3.45.

The band-shaped article of the present invention preferably has a swell value of 0% to −1.5%, more preferably 0% to −1.25%, the most preferably −0.5% to −1.2%.

It is advantageous that the band-shaped article of the present invention should have an index X represented by the above formula within the above range. It is also advantageous that it has an intrinsic viscosity (I.V.) of 0.75 to 1.2 (dl/g), preferably 0.75 to 0.9 (dl/g), and has an M.F.R. value of 15 to 30 (g/10 minutes), preferably 18 to 28 (g/10 minutes).

The band-shaped article of the present invention not only hardly splits but also has the property of being easily molten by heating. Therefore, it is of high utility value as a band for binding.

A band-shaped article obtained by re-melting a polyester as it is, which has been recovered from a molded article, has a low degree of polymerization and a large amount of terminal carboxyl groups, and is readily split with-a value of about 300 mm or less in a splitting test measured in accordance with a method which will be described hereinafter. The value is desirably about 500 mm or more in a splitting test made on a band-shaped article for packing or binding. The band-shaped article of the present invention has a value of 500 to 1,000 mm, preferably 950 to 1,500 mm, in this splitting test.

The band-shaped article of the present invention readily causes blocking and the band-shaped articles can be firmly bonded together by thermal welding. This blocking properties can be expressed as a friction coefficient in accordance with a method which will be described hereinafter. This friction coefficient is 0.2 to 0.25, preferably 0.24 to 0.25.

The shape of the band-shaped article of the present invention is not particularly limited, as long as it has sufficient length to allow it to be used as tape, ribbon, string, belt or the like for packing or binding. In general, a band-shaped article is suitable that has a cross section with a thickness, in a direction perpendicular to a longitudinal direction, of 100 to 2,000 μm and a width of 3 to 1,500 mm.

Further, the band-shaped article of the present invention has a high tensile strength required for its application purpose. For example, it has a tensile strength of 20 to 40 (kgf/g) as well as excellent welding strength and a high welding strength retention.

Figure 1:
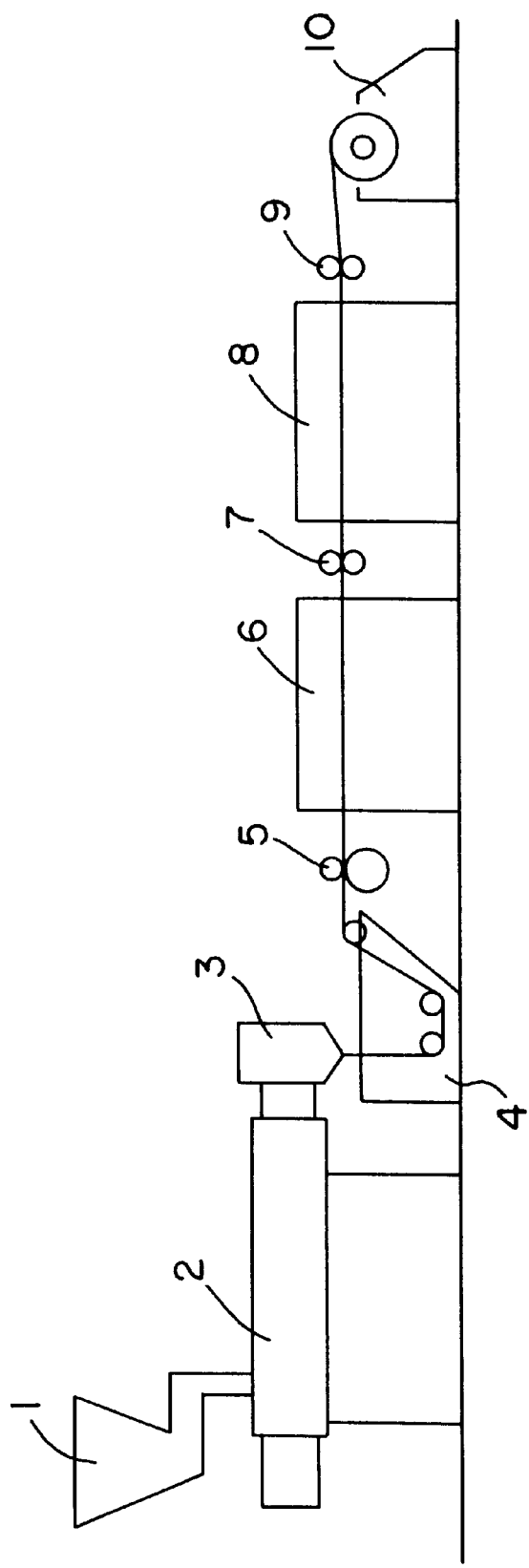
FIG. 1 is a schematic diagram of steps for carrying out the process of the present invention.

In the drawings, 1 is a hopper; 2, an extruder; 3, a die; 4, a cooling device; 5, a pair of rollers; 6, a stretching apparatus; 7, a pair of rollers; 8, a heat-setting apparatus; 9, a pair of rollers; 10, a winding device; 11, a band-shaped article (sample); 12, a cylinder; 13, a column (weight); H, a height; 21, a band-shaped article; 22, a band-shaped article; and 23, a weight.

The following examples are given to further illustrate the present invention.

In the following Examples and Comparative Examples, the intrinsic viscosity, M.F.R. and swell of a polyester and the splitting test and friction coefficient of a band-shaped article were measured in accordance with the following methods under the following conditions.

(1) Intrinsic viscosity (I.V.);

This is calculated from a viscosity (dl/g) measured at 35° C. in an orthochlorophenol solvent.

(2) M.F.R. (Melt Flow Rate);

This is measured under the condition 20 (a temperature of 280° C. and a load of 2.16 kg) of JIS K7210. In other words, a polyester is held in a piston with no load at 280° C. for 5 minutes, then a load of 2.16 kg is applied to the polyester and M.F.R. (g/10 minutes) is obtained from the weight and time of the first extrudate after 6 minutes from start of the test.

(3) Swell;

The diameters in longitudinal and transverse directions of an extrudate having a length of about 20 mm are measured at a position 5 mm from its bottom portion under the same conditions as the measurement of the above M.F.R. The swell value is calculated based on the following equation from the ratio of the average value of the above measured diameters to the diameter of the nozzle (2.095 mm).

swell value=(diameter of extrudate−2.095)/2.095×100 (%)

Figure 2:
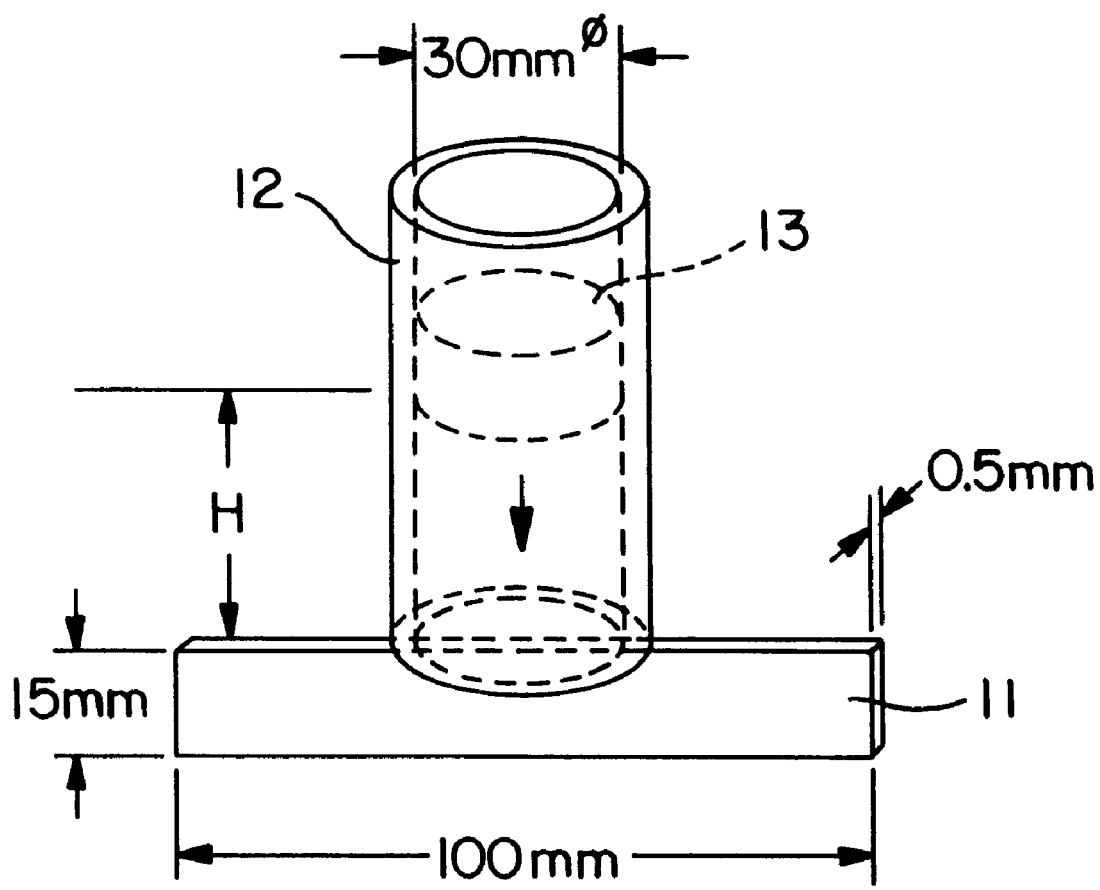
FIG. 2 is a schematic diagram of the measurement of the splitting test of a band-shaped article.

(4) Splitting test;

A band-shaped article having a length of 100 mm, a width of 15 mm and a thickness of 0.5 mm is set on a table as shown in FIG. 2, a cylinder having an inner diameter of 30 mm is placed thereon at 20° C., and a weight (a column having a diameter of 28 mm and a thickness of 58 mm) of 250 g is dropped from the top of the cylinder to measure the height (mm) of the weight when the band-shaped article splits. The splitting value is expressed by an average value of the measurement values of 5 samples.

Figure 3:
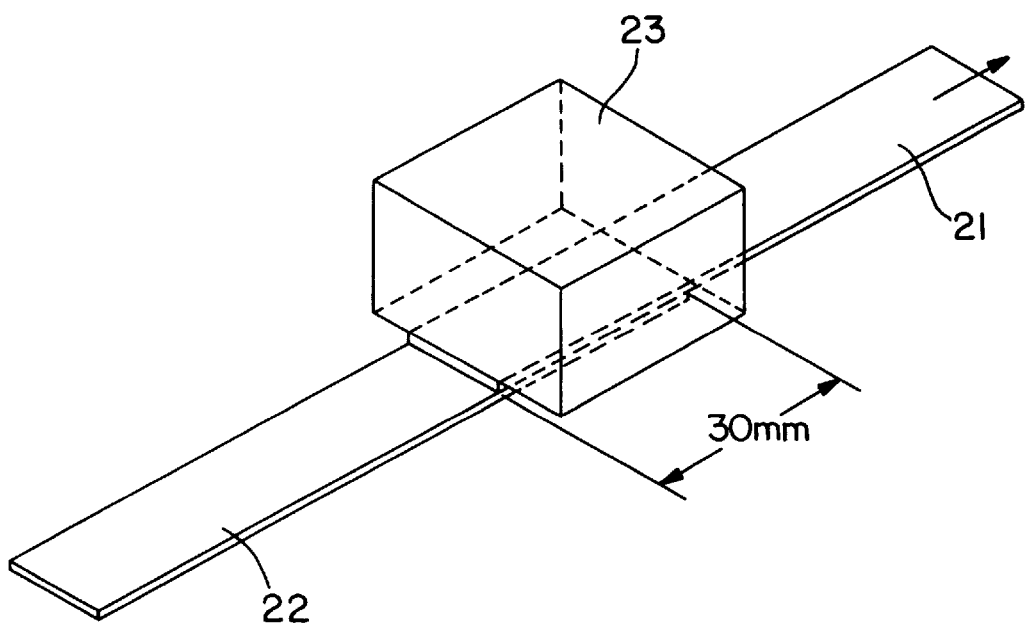
FIG. 3 is a schematic diagram of the measurement of the friction coefficient of a band-shaped article.

(5) Friction coefficient;

This is measured in accordance with the friction coefficient test of JIS K-7125. That is, as shown in FIG. 3, the 30-mm end portions of two band-shaped articles having a thickness of 0.5 mm and a width of 15 mm are laid on each other, a weight of 250 g is placed on the overlapped portions, one of the band-shaped articles is fixed at a temperature of 60° C. and the other band-shaped article is pulled at a pull rate of 100 mm/min. The tension (g) at this point is measured and the friction coefficient is calculated from the following equation. This is expressed by an average value of the measurement values of 5 samples.

friction coefficient=tension (g)/250 (g)

EXAMPLES

Example 1

Carefully selected ground flakes of an used polyethylene terephthalate container (PET bottle) were used as a raw material. The ground flakes had an intrinsic viscosity of 0.62 and were large in size enough to pass through 10-mm meshes. The ground flakes were dried at 140° C. for 17 hours.

Bisphenol A diglycidyl ether [Epicote 815 of Yuka Shell Epoxy Co., Ltd.] was used as a bifunctional epoxy compound and manganese acetate (tetrahydrate) was used as a catalyst.

The above ground flakes, the bifunctional epoxy compound and the catalyst were supplied in amounts of 100 parts by weight, 0.35 part by weight and 0.05 part by weight, respectively, to an end portion of an extruder by a hopper equipped with a stirrer. A quantitative feeder was furnished at the lower part of the hopper.

The extruder used was a type of unidirectional twin-screw having an L/D of 35, a compression ratio of 1:3 and a screw diameter of 60 mm and had two vent ports and a gear pump at a tip end portion. This extruder had a die at the end of the gear pump and a screen of 120 meshes between the gear pump and the die.

The extruder was partitioned into four sections in the direction of from a raw material supply port toward the tip end portion at a predetermined ratio, the four sections were heated to 200° C., 220° C., 250° C and 250° C., respectively, and the number of revolutions of the screw was set to be 150 rpm.

The shape of the die was rectangular corresponding to the cross section of a band-shaped article (40 mm×2 mm), and a polymer was discharged from the nozzle at a rate of 240 kg/hour. The discharged molten product passed through a cooling apparatus containing cooling water to be cooled to about 100° C. The speed of the band-shaped article raw material that had just passed through the cooling apparatus was 40 m/min, and the speed of a winder for taking up the band-shaped article was 200 m/min. Therefore, the stretching ratio was 5 times. Thus, after passing the cooling apparatus, the band-shaped article passed through a stretching apparatus and heat setting apparatus and was taken up by the winder. The stretching temperature was 280° C., and the heat setting temperature was 200° C. (2.4 sec).

The cross section of the obtained band-shaped article was a rectangle having the size of 15 mm×0.5 mm. The physical properties of the band-shaped article are shown in Table 1 below.

The intrinsic viscosity, M.F.R. value and swell value of the band-shaped article are also shown in Table 1.

It is understood from the results of Table 1 that a band-shaped article having an increased degree of polymerization and improved physical properties can be obtained from recovered polyester molded articles according to the present invention. Particularly, the band-shaped article according to the present invention does not split, has excellent blocking properties (friction coefficient) and is valuable as a band for packing or binding.

Example 2

The same ground flakes as in Example 1 were dried at 140° C. for 17 hours before used. 100 parts by weight of the ground flakes, 0.36 part by weight of bisphenol A glycidyl ether (Epicote 815) and 0.06 part by weight of manganese acetate (tetrahydrate) were mixed together, and the resulting mixture was dried at 120° C. for 7 hours.

The above mixture was supplied to a twin-screw extruder having two vent ports and extruded at a cylinder temperature of 265° C. (residence time of 3 minutes), and the polymer was discharged from a die having the same shape as in Example 1. The discharged molten product was stretched in the same manner as in Example 1 except that the stretching ratio was changed to 5.3 times, and heat set to obtain a band-shaped article. The results are shown in Table 1.

Example 3

The same ground flakes as in Example 1 were dried at 140° C. for 17 hours, stored in a pail can whose inside was substituted with nitrogen, and then, used as a raw material polyester. 100 parts by weight of the ground flakes, 0.35 part by weight of bisphenol A glycidyl ether (Epicote 815) and 0.05 part by weight of manganese acetate (tetrahydrate) were mixed together. This mixture was supplied to a twin-screw extruder having one vent port and extruded at a cylinder temperature of 265° C. (residence time of 4 minutes), and the polymer was discharged from a die having the same shape as in Example 1. The discharged molten product was stretched in the same manner as in Example 1 except that the stretching ratio was changed to 5.3 times, and heat set to obtain a band-shaped article. The results are shown in Table 1.

Example 4

The same ground flakes as in Example 1 were dried at 140° C. for 17 hours. The drying was carried out in a closed environment by directly connecting a hopper drier to the extruder. 100 parts by weight of the ground flakes, 0.35 part by weight of bisphenol A glycidyl ether (Epicote 815) and 0.05 part by weight of manganese acetate (tetrahydrate) were mixed together. This mixture was supplied to a twin-screw extruder having two vent ports and extruded at a cylinder temperature of 265° C. (residence time of 4 minutes), and the polymer was discharged from a die having the same shape as in Example 1. The discharged molten product was stretched in the same manner as in Example 1 except that the stretching ratio was changed to 5.3 times, and heat set to obtain a band-shaped article. The results are shown in Table 1.

Comparative Example 1

The same ground flakes as in Example 1 were dried in the same manner as in Example 1 and used as a raw material, and a band-shaped article was obtained in the same manner as in Example 1 except that a bifunctional epoxy compound and a catalyst were not used. The results are shown in Table 1.

Comparative Example 2

A band-shaped article was obtained in the same manner as in Comparative Example 1 except that a polyethylene terephthalate chip (virgin) having an intrinsic viscosity of 1.05 and obtained by polymerization was dried and used as a raw material in place of the ground flakes. The results are shown in Table 1.

TABLE

| Ex. Item | Ex. 1 | Ex. 2 | Ex. 3 | Ex. 4 | C. Ex. 1 | C. Ex. 2 |
|---|---|---|---|---|---|---|
| Intrinsic viscosity of band-shaped article (dl/g) | 0.800 | 0.790 | 0.750 | 0.850 | 0.45 | 0.85 |
| M.F.R. value of band-shaped article (g/10 minutes) | 28 | 26 | 25 | 20 | 12 | 15 |
| Swell value of band-shaped article | 0% | −4.7% | 0% | −1.0% | −38.5% | −25.1% |
| Index (X) of band-shaped article | 3.6 | 3.39 | 3.25 | 2.85 | 1.65 | 2.35 |
| Tensile strength (kgf) | 380 | 394.8 | 377.2 | 400 | 360 | 400 |
| Tensile strength (kgf/mm$^2$) | 50.7 | 52.7 | 52.0 | 53 | 48 | 53.3 |
| Tensile strength per g (kgf/g) | 33 | 35.6 | 35.0 | 36 | 31 | 37.7 |
| Elongation at break (%) | 10 | 11.2 | 10.8 | 11.0 | 9 | 11 |
| Welding strength (kg/mm$^2$) | 280.0 | 315.84 | 300.0 | 340.0 | 260 | 300 |
| Welding strength retention (%) | 73.6 | 80.0 | 79.5 | 85.0 | 72 | 75 |
| Splitting properties | not split | not split | not split | not split | markedly split | not split |
| Impact resistance (mm) | 900 | 950 | 900 | 950< | 350 | 950< |
| Friction coefficient | 0.24 | 0.25 | 0.24 | 0.25 | 0.18 | 0.25 |

Ex. = Example,
C. Ex. = Comparative Example

What is claimed is:

1. A process for producing a band-shaped article comprising:
    (1) the step (reaction step) of obtaining molten polyethylene terephthalate (B) having a high degree of polymerization and having an intrinsic viscosity higher than the intrinsic viscosity of the polyethylene terephthalate (A) by at least 0.05 dl/q by heating and melting (a) 100 parts by weight of polyethylene terephthalate (A), (b) 0.1 to 10 parts by weight of a bifunctional epoxy compound and (c) an epoxy ring-opening catalyst;
    (2) the step (extrusion step) of extruding the obtained molten product into a sheet from a die; and
    (3) the step (stretching step) of stretching the obtained sheet to 5 to 15 times in a longitudinal direction based on the original length of the sheet and subjecting it to heat-setting.
2. The process for producing a band-shaped article according to claim 1, wherein the bifunctional epoxy compound is a bifunctional bisphenol A epoxy compound, glycidyl ester-based epoxy compound or polyalkylene glycol glycidyl ether-based epoxy compound.
3. The process for producing a band-shaped article of claim 1 or 2, wherein the polyethylene terephthalate (A) is recovered from its molded articles.
4. The process for producing a band-shaped article of claim 1, wherein the epoxy ring-opening catalyst is used in an amount of 0.001 to 5 parts by weight based on 100 parts by weight of the polyethylene terephthalate (A).
5. The process for producing a band-shaped article of claim 1, wherein the epoxy ring-opening catalyst is at least one catalyst selected from the group consisting of (i) carboxylates, halides, carbonates and bicarbonates of alkali metals, (ii) carboxylates of alkaline earth metals, (iii) carboxylates of aluminum, zinc and manganese, (iv) carbonates of manganese, (v) β-keto complexes of aluminum and cobalt, and (vi) aryl- and alkyl-substituted phosphines.
6. The process for producing a band-shaped article of claim 1, wherein heating and melting in the reaction step are carried out at a temperature of 260 to 330° C. for 0.5 to 15 minutes.
7. The process for producing a band-shaped article of claim 1, wherein the reaction step and the extrusion step are carried out at least successively.

8. The process for producing a band-shaped article of claim 1, wherein the obtained band-shaped article has an intrinsic viscosity of 0.75 to 1.2 dl/g.

9. A process for producing a band-shaped article comprising:
   (1) the step of obtaining molten polyethylene terephthalate (B) having a high degree of polymerization and having an intrinsic viscosity higher than the intrinsic viscosity of the polyethylene terephthalate (A) by at least 0.05 dl/g by heating and melting and reacting (a) 100 parts by weight of polyethylene terephthalate (A) and (b) 0.1 to 10 parts by weight of a bifunctional epoxy compound in contact with (c) an epoxy ring-opening catalyst;
   (2) the step of extruding the obtained molten product into a sheet from a die; and
   (3) the step of stretching the obtained sheet to 5 to 15 times in a longitudinal direction based on the original length of the sheet and subjecting it to heat-setting,
   wherein the bifunctional epoxy compound is a bifunctional bisphenol A epoxy compound, glycidyl ester-based epoxy compound or polyalkylene glycol glycidyl ester-based epoxy compound, and
   wherein the epoxy ring-opening catalyst is manganese acetate and is used in an amount of 0.01 to 3 parts by weight based on 100 parts by weight of the polyethylene terephthalate (A).

10. The process for producing a band-shaped article of claim 9, wherein the polyethylene terephthalate (A) is recovered from its molded articles.

11. The process for producing a band-shaped article of claim 9, wherein heating and melting in the reaction step are carried out at a temperature of 260 to 330° C. for 0.5 to 15 minutes.

12. The process for producing a band-shaped article of claim 9, wherein the obtained band-shaped article has an intrinsic viscosity of 0.75 to 1.2 dl/g.

* * * * *